United States Patent [19]

Pelensky et al.

[11] 4,207,581
[45] Jun. 10, 1980

[54] RECORDING INSTRUMENT MARKER MOUNTING ASSEMBLY AND PRECISION ADJUSTMENT CONTROL KNOB THEREFOR

[75] Inventors: Joseph Pelensky, Philadelphia, Pa.; William A. Tallerico, Willingboro, N.J.

[73] Assignee: Graphic Controls Corporation, Cherry Hill, N.J.

[21] Appl. No.: 918,562

[22] Filed: Jun. 23, 1978

[51] Int. Cl.² .................................................. G01D 13/22
[52] U.S. Cl. .................................. 346/139 R; 116/331
[58] Field of Search .......... 346/139 R, 139 C, 140 R; 116/291, 331

[56] References Cited

U.S. PATENT DOCUMENTS

| | | | |
|---|---|---|---|
| 1,906,155 | 4/1933 | Hodgson | 346/139 R X |
| 2,319,782 | 5/1943 | Rourke | 116/291 X |
| 2,646,337 | 7/1953 | Gorham | 346/145 |
| 3,264,652 | 8/1966 | Squier | 346/140 R |
| 3,311,920 | 3/1967 | Thompson | 346/140 R |
| 3,383,702 | 5/1968 | Donahue | 346/140 R |
| 3,604,390 | 9/1971 | Zuck | 116/331 |
| 3,611,428 | 10/1971 | Okleshen | 346/139 C |
| 3,771,166 | 11/1973 | Tullos | 346/140 R |

Primary Examiner—Joseph W. Hartary
Attorney, Agent, or Firm—Miller & Prestia

[57] ABSTRACT

Recording instrument marker mounting assembly is provided so that the marker can be pivoted relative to a mounting leg of the assembly which mounting leg is to be connected to an operating shaft of the recording instrument. In this manner, the lateral position of the marker can be adjusted relative to the recorder paper or chart which is to be imprinted upon. The mounting assembly comprises a mounting leg to be connected with the operating shaft, a cam connecting a marker support arm and the mounting leg, and cam follower means positioned on the support arm. Pivotal movement of the support arm relative to the mounting leg is actuated by rotation of the cam. In a preferred embodiment of the invention, the cam is formed integrally with a manually engageable precision adjustment knob, which includes a notch or the like so that the operator may gauge the position of the marker relative to the mounting leg.

8 Claims, 6 Drawing Figures

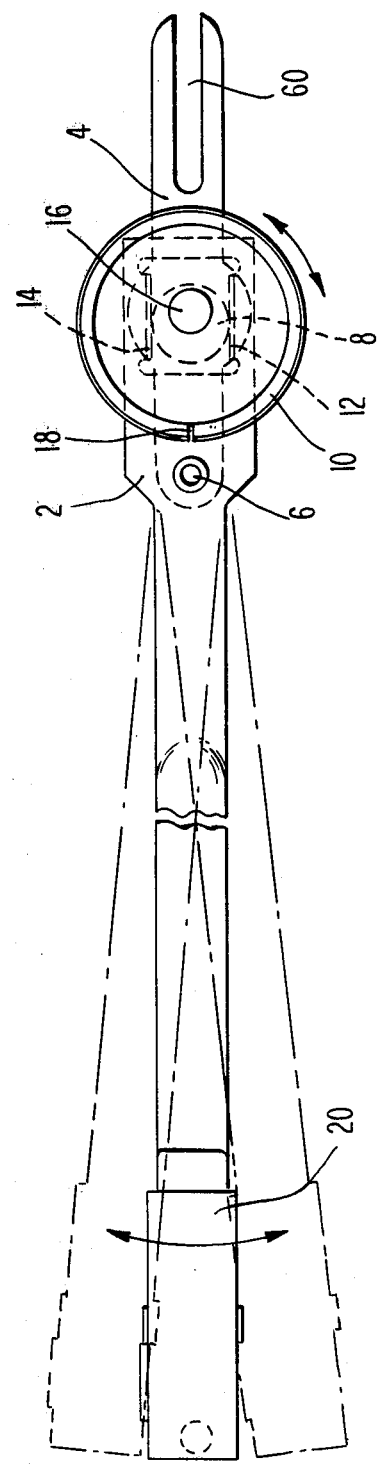
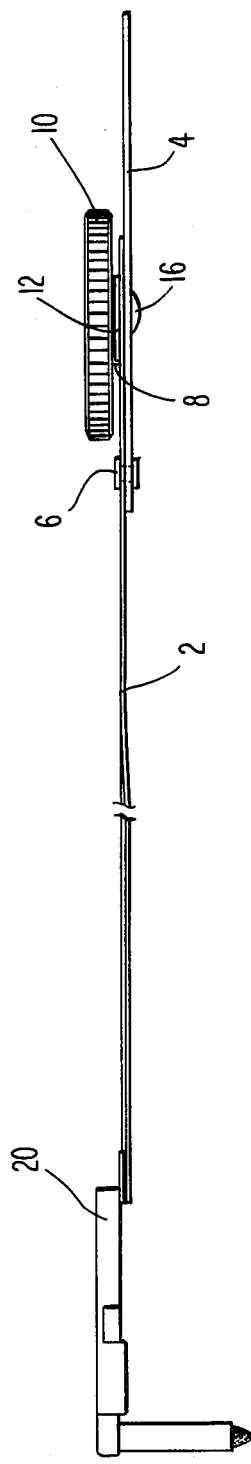
Fig. 1
Fig. 2

RECORDING INSTRUMENT MARKER MOUNTING ASSEMBLY AND PRECISION ADJUSTMENT CONTROL KNOB THEREFOR

INTRODUCTION

The present invention relates to an adjustable marker mounting assembly adapted for use in a recording instrument. More specifically, the invention relates to a mounting assembly in which pivotal movement of a cam effects an adjustment of the marker position relative to an associated mounting leg connected to the shaft instrument.

BACKGROUND OF THE INVENTION

In recording instruments, it is often desirable to provide a pivotal connection between the marker (or pen, for present purposes the terms "marker" and "pen" are used interchangeably) support arm and an operating shaft of the marker with respect to a chart or the like which is to be imprinted upon by the marker.

In U.S. Pat. No. 3,771,166 (Tullos), lateral positioning of the marker is controlled by a micrometer screw which is threaded through a port that is carried by an arm which is rigidly connected to the operating arm of the recorder. Engagement of the micrometer screw actuates pivotal movement of the marker support arm about a fulcrum pin which connects the marker support arm to the arm which is to be rigidly connected to the recorder operating arm. U.S. Pat. No. 3,264,652 (Squier) discloses a similar mechanism.

In U.S. Pat. No. 3,311,920 (Thompson), positioning of the marker is controlled by the provision of a hub which connects the marker support arm to a rotatable drive shaft.

In U.S. Pat. No. 2,646,337 (Gorham), the operating shafts 128 of the instrument are connected to the writing instruments 12 and their associated spindles 124 by the provision of crank arms 130 to actuate oscillating movement of the writing instruments (see FIG. 2 of this reference patent).

Another means for adjustably positioning the writing elements in relation to a recorder chart is shown in U.S. Pat. No. 3,383,702 (Donahue) wherein the writing instruments are carried in pivotal balls which are adjustably positioned in "U" shaped brackets that are rigidly bolted to the instrument frame.

Despite these prior art mechanisms, there remains a need in the art for an assembly that provides reliable pivotal positioning of the marker relative to the operating shaft of the recorder instrument so that the marker may be adjustably, laterally positioned with respect to the desired recorder paper or chart which is to be imprinted thereon.

There also remains a need for such an assembly which securely holds the marker in its desired, adjusted position even when vibrational stress is exerted on the marker support arm.

Further, there remains a need for a marker instrument mounting assembly providing pivotal movement of the marker relative to the instrument operating arm that it is readily manually actuated by the instrument operator. Moreover, an assembly that also provides a means for gauging the relative positions of the pen and operating arm is especially desirable.

These and other needs are met by the recording instrument marker mounting assembly and precision adjustment control knob disclosed herein, which will be understood more clearly and fully from the following detailed description, when read in conjunction with the accompanying drawings.

BRIEF DESCRIPTION OF THE DRAWINGS

In the drawings:

FIG. 1 is a plan view of the assembly, including certain hidden portions and alternate positions thereof shown in phanton for increased clarity;

FIG. 2 is a side elevational view of the assembly shown in FIG. 1;

DETAILED DESCRIPTION

Figure 3:
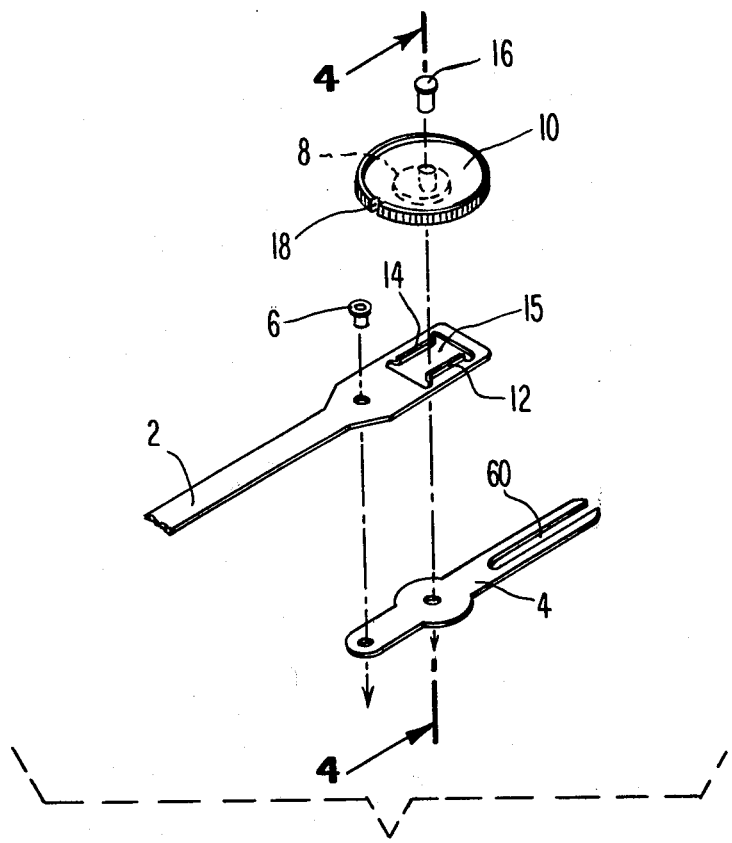
FIG. 3 is an exploded perspective view of the marker mounting assembly and associated precision adjustment knob of FIG. 1.

In the specification which follows, specific terms will be used for the sake of clarity, and as descriptions of the specific forms of the invention which have been selected for illustration in the drawings. However, the use of such specific terms, and the use of such specific embodiments in the drawings, is not intended to imply any limitation with respect to the scope of the invention which is defined in the appended claims.

With reference to FIG. 3 of the drawings, there is shown an instrument marker mounting assembly in accordance with the invention. The assembly comprises marker support arm 2 pivotally connected to mounting leg 4 by fulcrum rivet pin 6. The support arm and mounting leg are preferably formed from hard, stainless steel. It is to be noted that fulcrum rivet pin 6 can also be positioned toward the rearward portion of support arm 2 behind cut out position portion 15.

Mounting leg 4 comprises slot 60, through which a thumb screw, stabilizing screw or the like may be inserted to rigidly fix mounting leg 4 to an operating shaft of a recording instrument (not shown).

Figure 4:
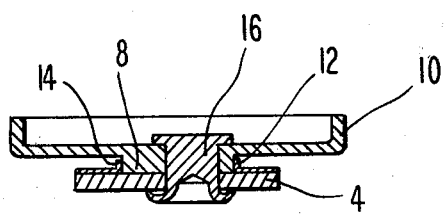
FIG. 4 is a sectional view taken in the plane indicated by sight arrows 4—4 of FIG. 3.

As can be best seen in FIG. 4, cam 8, formed integrally on the underside of adjustment knob 10 is tracked inside of cam follower surfaces 12 and 14 which are upwardly turned edges located along opposed edges of cut out portion 15 of support arm 2. The surfaces 12, 14 comprise spring tabs which bear against cam 8. Preferably, the free state between the spring tabs is less than the cam diameter. This results in a controlled force being exerted on the cam by the friction action of the tabs as the tabs are fitted over the cam during assembly. This force can be adjusted by changing the fit interference between cam 8 and the spring tabs, or by changing the height of the tabs. The force can also be altered by changing the radius of the tab bend, or by changing the thickness of support arm 2. Also, control of the length of cut out portion 15 can alter the friction action of the tabs.

Figure 5:
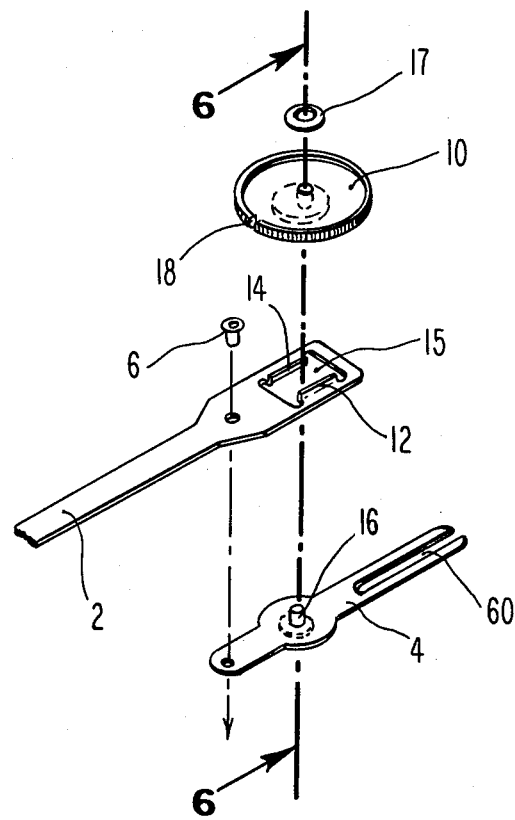
FIG. 5 is an exploded perspective view of the preferred embodiment of the marker mounting assembly and associated precision adjustment knob.
Figure 6:
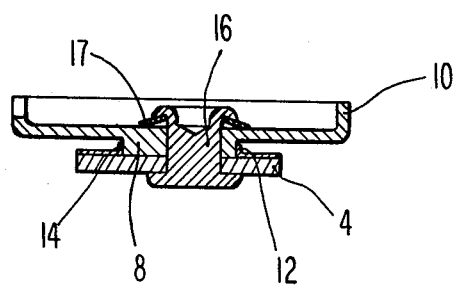
FIG. 6 is a sectional view taken in the plane indicated by sight arrows 6—6 of FIG. 5.

Turning now to the preferred embodiment of the invention depicted in FIGS. 5 and 6, the bottom portion of rivet 16 is welded to mounting leg 4 and the rivet extends through an eccentrically located opening in knob 10 and cam 8. The upper end of rivet 16 is curled over spring washer 17 to secure the assembly. Spring washer 17 is compressed to a controlled deflection thus eliminating both radial and axial end play between rivet 16 and knob 10, cam 8 and mounting leg 4.

As best seen in FIGS. 1 and 3, knob 10 is provided with a groove or drilled spot 18, which serves as a setting gauge, to indicate the relative position of support arm 2 and marker 20 mounted thereon with mounting leg 4 or an operating shaft of the recorder mechanism (not shown) which is to be connected to the mounting leg.

Due to the interference fit between the tabs and cam 8, and the controlled compression of spring washer 17 (FIGS. 5 and 6) the assembly prevents free play between support arm 2 and mounting leg 4. The construction thus inhibits undesirable movement of the support arm relative to the mounting leg or an operating shaft associated therewith, which may be initiated by vibration or any movements other than by turning adjustment knob 10.

Turning to FIG. 1, it is apparent that the instrument operator, when desiring to adjust the lateral position of marker 20 in relation to mounting leg 4, simply turns knob 10 in either the clockwise or counterclockwise direction as indicated by the arrows appearing in the right hand portion of FIG. 1. The cam thus drives support arm 2 in the directions indicated by the arrows at the left hand portion of FIG. 1. The operator may then note the position of groove 18, so that he can later set the marker in approximately the same position. In this manner, the operator may adjust the lateral position of the marker relative to the recorder paper or chart.

Having described our invention, we claim for Letters Patent:

1. Recording instrument marker mounting assembly of the type adapted to couple a marker to an operating shaft of a recording instrument, said assembly comprising, a marker support arm, a mounting leg to be connected with an operating shaft of a recording instrument, cam means connecting said support arm and said mounting leg, cam follower means comprising a pair of cam follower surfaces defined by a cut out portion of said support arm, said cam means being positioned between said cam follower surfaces, fulcrum means connecting said support arm and said mounting leg to act as a fulcrum for pivotal movement of said support arm relative to said mounting leg whereby rotation of said cam actuates said pivotal movement, wherein the distance between said cam follower surfaces is less than the diameter of said cam means so as to provide an interference fit of said cam means and said cam follower surfaces whereby free play between said support arm and said mounting leg is prevented.

2. Recording instrument marker mounting assembly as recited in claim 1 wherein said cam follower surfaces comprise a pair of spring tabs.

3. Recording instrument marker mounting assembly as recited in claim 1 further comprising an adjustment knob carrying said cam means.

4. Recording instrument marker mounting assembly as recited in claim 3 wherein said adjustment knob further comprises gauging means for guaging the position of said support arm relative to said mounting leg.

5. Recording instrument marker mounting assembly as recited in claim 3 wherein said cam and said knob comprise an integral one piece unit.

6. Recording instrument marker mounting assembly as recited in claim 3 further comprising a pin having a top and bottom portion, said pin extending through said knob, said cam, said support cam and said bottom pin portion being attached to said mounting leg.

7. Recording instrument marker mounting assembly as recited in claim 6 wherein said fulcrum means comprises a rivet pin.

8. Recording instrument as recited in claim 6 further comprising a spring washer interposed between the top of said pin and said knob.

* * * * *